Nov. 10, 1959 J. E. DUNCAN 2,912,607
HYSTERESIS CLUTCH
Filed July 5, 1956 2 Sheets-Sheet 1
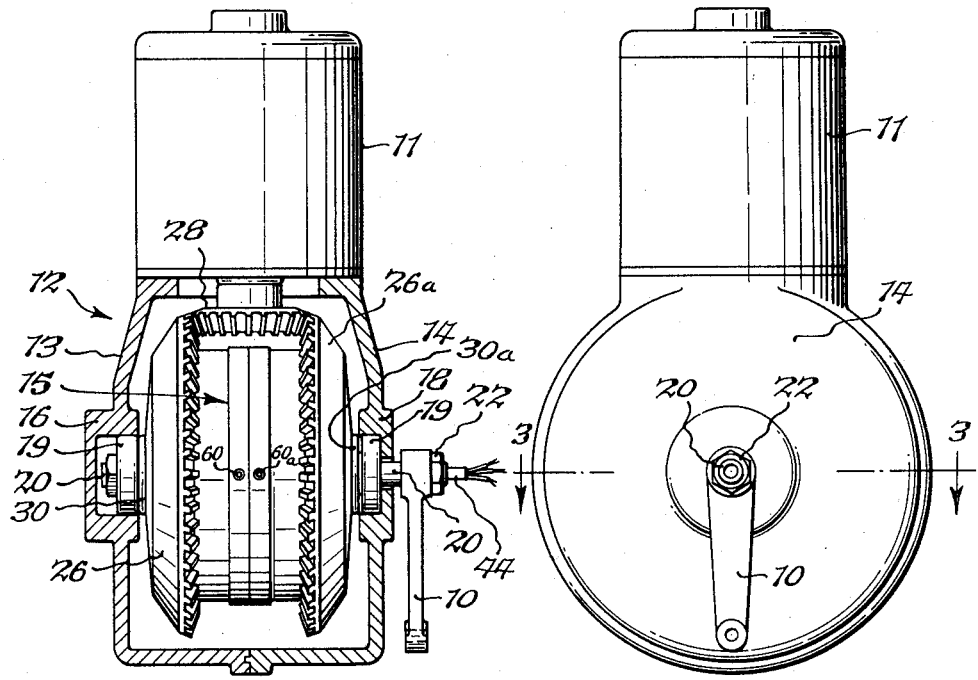
Fig. 1.
Fig. 2.
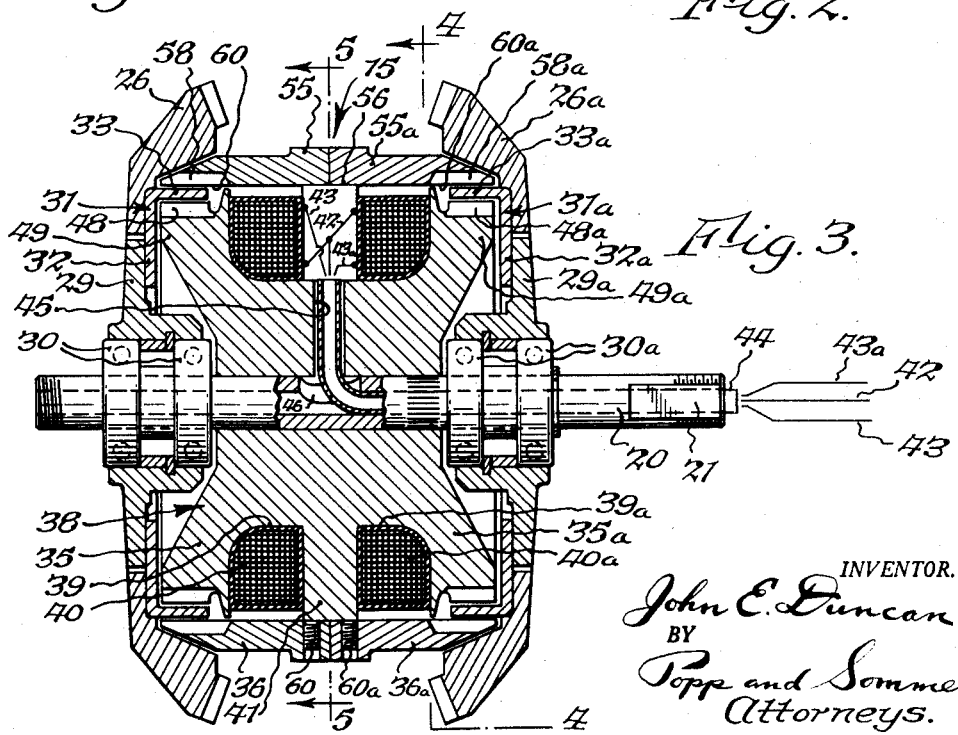
Fig. 3.
INVENTOR.
John E. Duncan
BY
Popp and Sommer
Attorneys.

INVENTOR.
John E. Duncan
BY
Popp and Sommer
Attorneys.

United States Patent Office 2,912,607
Patented Nov. 10, 1959

2,912,607

HYSTERESIS CLUTCH

John E. Duncan, Buffalo, N.Y.

Application July 5, 1956, Serial No. 596,035

2 Claims. (Cl. 310—99)

This invention relates to a hysteresis clutch and more particularly to a bi-directional actuator employing two hysteresis clutches side by side in a differential mechanism whereby the energization of the coils of one or the other of the hysteresis clutches, or the differential energization of these clutches produces a proportionate mechanical output in a corresponding direction. Such magnetic clutches alone, or in such a bi-directional actuator, are used to control power, to start and stop rapidly, to maintain tension, to control torque, to limit torque, or to reverse direction, the latter being a particular feature of the bi-directional actuator.

General objects of the present invention are to provide such a hysteresis clutch and bi-directional actuator characterized by long life under condition of severe and constant use, extreme smoothness in operation, constant repetition in action with the same characteristics, and ability to slip without wear.

A specific object of the present invention is to provide a simple mechanism for readily adjusting the response of such a hysteresis clutch to an exact value. In the normal manufacture of such clutches, it is impossible to obtain exact uniformity in such values for a series of clutches, and in the practice of the present invention, as the final operation in producing a series of clutches to have identical operating characteristics, the present clutches are adjusted to have such uniformity.

Another important specific object of the present invention is to provide a bi-directional actuator which is extremely compact and simple in construction and operation and can be produced at very low cost.

Another specific object is to provide such a bi-directional actuator which operates without backlash of gears and is smooth and exact in its operation.

Another specific object is to provide such a bi-directional actuator, including two hysteresis clutches in which each of the component hysteresis clutches can be adjusted as above described so that the two hysteresis clutches of the bi-directional actuator are in balance with each other and so that a series of bi-directional actuators can be produced which have identical operating characteristics.

Another specific object of the invention is to provide an electrical bi-directional actuator which does not require slip rings but can operate by merely twisting the wires supplying the operating current.

Other objects and advantages of the invention will be apparent from the following description and accompanying drawings in which:

Fig. 1 is a side elevational view of a bi-directional actuator embodying the present invention and showing one form of motor drive for the same.

Fig. 2 is a front elevational view thereof viewed from the right hand side of Fig. 1.

Fig. 3 is an enlarged horizontal transverse sectional view through the bi-directional actuator, this section being taken generally on line 3—3, Fig. 2, and the motor drive and supporting bracket being eliminated.

Figure 4:
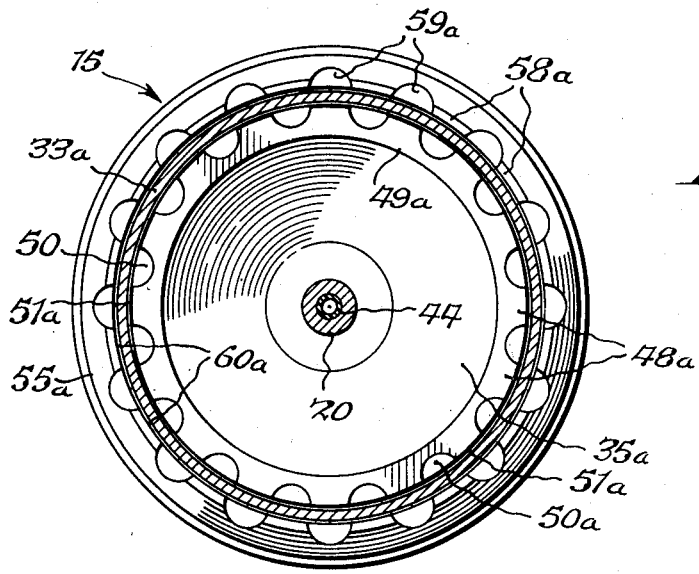
Figs. 4 and 5 are vertical transverse sections taken generally on the correspondingly numbered lines of Fig. 3.
Figure 5:
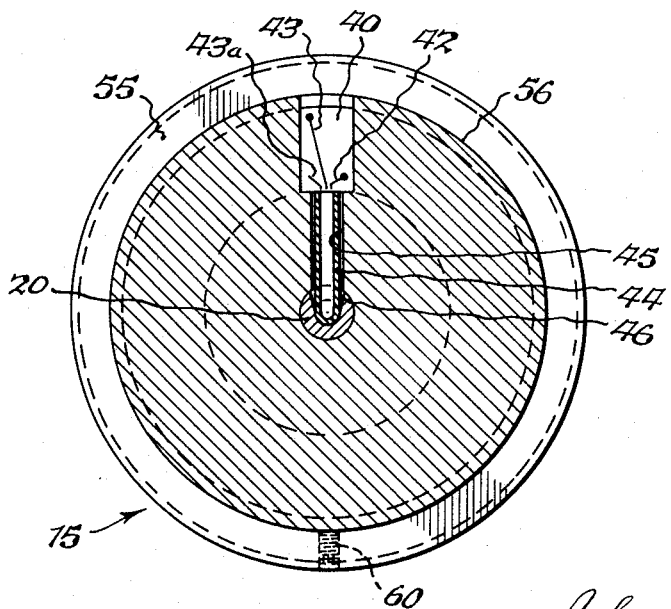

The bi-directional actuator forming the subject of the present invention has many applications and is illustrated as controlling the direction and rate of movement and torque of a lever arm 10 driven by an electric motor 11, the bi-directional actuator also permitting of starting and stopping movement of the lever arm 10 rapidly in either direction.

The motor 11 is shown as mounted on a two part bracket 12 having spaced rear and front parts 13, 14 which house the bi-directional actuator forming the subject of the present invention and indicated generally at 15. For this purpose, the sides 13, 14 are severally provided with hubs 16, 18 each of which carries an anti-friction bearing 19 for the tubular output or driven shaft 20 of the bi-directional actuator and which carries the lever arm 10. To mount the lever arm 10, an end of the driven shaft projecting from the hub 18 is shown as provided with a flat 21 which mates with a flat in the bore of the hub of the lever arm 10, and a nut 22 secures the lever arm against displacement from the driven shaft.

The bi-directional actuator 15 forming the subject of the present invention is of substantially symmetrical construction on opposite sides and hence the same reference numerals have been applied to the parts on opposite sides of the actuator and distinguished by the suffix "a." Thus, the bi-directional actuator includes a pair of differential beveled gears 26, 26a shown as driven by a common beveled pinion 28 of the motor 11 and as arranged within the rear and front parts 13, 14 of the bracket 12 and as rotatable coaxially about the driven shaft 16. For this purpose, each beveled gear is provided with a hub 29, 29a which is preferably made of aluminum or some similar metal to provide magnetic shielding for the pairs of ball bearings 30, 30a which support these hubs on the output shaft 20. A feature of the hysteresis clutch at each side of the bi-directional actuator 15 is that each beveled gear 26, 26a is connected to its hub 29, 29a by a cup-shaped hysteresis rotor 31, 31a. Each hysteresis rotor has an annular flat wall 32, 32a which is secured in any suitable manner to the opposing faces of the beveled gears 26, 26a and their hubs 29, 29a and also has a cylindrical rim or flange 33, 33a which rims project axially in opposing relation to each other. Each rotor 31, 31a is made of permanent magnet material and rotates with the beveled gears 26, 26a about the roller bearings 30, 30a.

The output assembly of the hysteresis clutch at each side of the bi-directional actuator is composed of an inner multi-poled member 35, 35a and an outer multi-poled member 36, 36a. The inner multi-poled members 35, 35a of the two hysteresis clutches are in the form of a common casting 38 of high magnetic permeability and fixed to the output shaft 20 in any suitable manner. This common casting is shown as having two spaced annular channels 39, 39a in each of which is wound an inductance coil 40, 40a. These electric coils 40, 40a are shown as having a common annular pole 41, the continuity of which is interrupted by a space through which the leads 42, 43 and 43a extend from a conduit or tube 44 to each coil, these leads comprising a common lead 42 and a separate left and right lead 43, 43a to the left and right coils 40, 40a, respectively, as viewed in Fig. 3. The conduit or tube extends through a radial bore 45 in the casting 38 and opening 46 through the wall of the tubular output shaft 20 and emerges from one end of this tubular output shaft 20 as best shown in Figs. 3 and 4. It is not necessary, however, that the inner multi-poled members 35, 35a have the common pole 41 or that they be made in the form of a common casting 38 since they could be separate multi-poled members separately secured to the output shaft 20. It will be noted, however, that slip rings or the like are not required for the current supply to the wires 42, 43 and 43a as the degree of turning of the bi-directional actuator is not sufficient to require such slip rings.

The series of poles 48, 48a of each inner multi-poled member 35, 35a are severally formed in a rim 49, 49a formed by the corresponding annular channel 39, 39a for the corresponding inductance coil 40, 40a, and each series of these poles is embraced by the corresponding cup-shaped hysteresis rotor 31, 31a as best shown in Fig. 3. As best shown in Fig. 4, the poles 48a, and hence the poles 48 are provided at regularly spaced intervals around the rim 49a and are formed by intermediate indentations 50a which are preferably of arcuate or semi-cylindrical form extending parallel with the axis of the device. The outer surfaces 51, 51a of the poles 48, 48a are concentric with the axis of the device and are arranged in closely spaced relation to the corresponding flange 33, 33a of the hysteresis rotor 31, 31a. Also, desirably, the circumferential extent of each face 51, 51a is preferably approximately equal to the circumferential extent of each recess 50, 50a.

Each hysteresis clutch has an outer multi-poled member 55, 55a in the form of a sleeve of magnetically permeable material fitted over the peripheral surface 56 of the common pole 41 for the two inductance coils 40, 40a and which common pole 41 is made of cylindrical form concentric with the axis of rotation of the device for this purpose. This cylindrical face 56 is of slightly greater diameter than the external diameter of the cup-shaped hysteresis rotors 31, 31a, and the inner surfaces of the outer multi-poled members 55, 55a are cylindrical with their outer extremities traveling in closely spaced relation to the rims 33, 33a of the cup-shaped hysteresis rotors 31, 31a. This outer extremity of each outer multi-poled member 55, 55a is provided with an annular series of uniformly spaced poles 58, 58a which correspond in number to the poles 48, 48a of the inner multi-poled member 35, 35a. Similarly, the poles 58, 58a are provided by axially extending grooves 59, 59a which are of semi-cylindrical form and extend axially of the device. Also, the circumferential face 66, 60a of each pole 58, 58a is preferably approximately equal to the circumferential extent of the groove 59, 59a.

An important feature of the invention resides in the ability to derate either hysteresis clutch by shifting the centers of the poles 58, 58a of the outer multi-poled member 55, 55a circumferentially with reference to the poles 48, 48a of the inner multi-poled member 35, 35a. It is impossible with normal manufacturing practices to provide identical operating characteristics for the hysteresis clutches at opposite sides of the bi-directional actuator shown. By adjustably derating one or the other of the hysteresis clutches, a torque output balance can be provided between the two which will insure identical operation of the bi-directional actuator, in either direction, in response to the same values of current supplied to the coils 40, 40a. The adjustment so permitting the derating of either hysteresis clutch is achieved by the simple expedient of providing a set screw 60, 60a in each of the outer multi-poled members 55, 55a and working in radially extending threaded holes therein to screw against the cylindrical periphery 56 of the common pole 41 for the two coils 40, 40a. By loosening either of these set screws the poles 58, 58a of the corresponding outer multi-poled member 55, 55a can be moved circumferentially into a position of greater or less alinement with the corresponding poles 48, 48a of the inner multi-poled member 35, 35a. Since the maximum magnetic coupling between the poles 48, 48a and the poles 58, 58a is achieved when they are completely out of alinement, as shown in Fig. 4, it will be seen that by loosening the corresponding set screw 60, 60a and by rotating the corresponding outer multi-poled member 55, 55a, the magnetic coupling can be reduced to derate either hysteresis clutch to the required value in balancing the output of the bi-directional actuator.

*Operation*

The operation of the bi-directional actuator, as well as of the hysteresis clutches forming the subject of the present application is as follows:

With the motor 11 running, its beveled pinion 28 is driving one beveled gear 26 in one direction and the other beveled gear 26a in the opposite direction, the aluminum hubs 29, 29a of these gears rotating on the bearings 30, 30a on the tubular output shaft 20. Accordingly, the cup-shaped hysteresis rotors 31, 31a, which severally connect these beveled gears to their hubs, are rotated in opposite directions. These cup-shaped hysteresis rotors 31, 31a are made of a permanent magnet material but there is no magnetic coupling with the driven parts of the clutches until a magnetic field is established across the multiple poles 48, 58 or 48a, 58a. Accordingly, at this time, the beveled gears 26, 26a merely rotate idly in opposing directions carrying with them the hysteresis rotors 31, 31a attached thereto.

If it is desired to rotate the lever arm 10 in one direction, one of the coils 40, 40a, say the coil 40, is energized from a direct current source, this direct current being supplied through the line 43 to one end of the coil 40 and returning through the common line 42. Energizing the coil 40 establishes a magnetic field from the common pole 41 through the outer multi-poled member 55 through its poles 58, across the rim 33 of the hysteresis rotor 31 to the poles 48 of the inner multi-poled member 35 and through the pole formed by the rim 49 of this inner multi-poled member 35 back to the coil 40. The lines of magnetic force from the poles 58 across the rim 33 of the hysteresis rotor 31 to the poles 48 provide a tractive force between this hysteresis rotor and the poles 48, 58, and since these poles are part of the connected inner and outer multi-poled members 35, 55, this tractive force rotates these coupled members in a corresponding direction. Since the inner multi-poled member 35 is part of the casting 38 fixed to the output shaft 20, this output shaft is rotated in a corresponding direction thereby to rotate the lever arm 10 in the same direction. This lever arm can be used to control any other instrumentality (not shown) which the bi-directional actuator of the present invention serves.

Conversely, by passing direct current from the lines 43a, 42 through the coil 40a, a magnetic field will be established across the poles 48a, 58a and through the rim 33a of the corresponding hysteresis rotor 31a. Accordingly, the tractive force established between this rotor 31a and these poles 48a, 58a will drive the connected inner and outer multi-poled pieces 35a, 55a in the opposite direction from that which obtained when the coil 40 was energized, as first assumed, so that the output shaft 20 will also be rotated in a reverse direction.

It will also be apparent that if the current supplied to the two coils 40, 40a is identical, their electro-magnetic effects cancel each other out so that the hysteresis rotors 31, 31a merely rotate in opposite directions with equal tractive effect upon the poles 48, 58 and 48a, 58a, respectively, so that neither the casting 38 nor the output shaft 20 will be turned. If from this condition more current is passed through one or the other of the coils 40, 40a, this condition of magnetic and tractive balance will be overcome and the output shaft 20 will be driven in the direction determined by control of the coil 40 or 40a through which the greater amount of current is being passed.

With the same current passing through both of the coils 40, 40a, balance is only achieved, that is, the output shaft 20 remaining stationary, provided the operating characteristics of the hysteresis clutches of these coils are identical. With normal manufacture, it is impossible to achieve such balance. Accordingly, to balance the clutches, it is necessary to loosen one or the other of the set screws 60 or 60a and rotate the corresponding outer multi-poled member 55 or 55a so as to derate the hysteresis clutch at the corresponding side of the device. Thus, if the tractive effect of the hysteresis rotor 31a is too great when identical currents are passing through the coils 40, 40a (and which excess tractive force is indicated by movement of the output shaft 20 in a corresponding direction) the operator would loosen the set screw 60a and rotate the outer multi-poled member 55a so as to bring its poles 58a out of alinement with the recesses between the poles 48a. The greater the misalinement, the less the tractive effect upon the hysteresis rotor 31a and accordingly, this tractive effect can be adjusted until it exactly equals the tractive effect of the hysteresis rotor 31 with identical currents passing through the coils 40, 40a. The set screw 60a would then, of course, be tightened.

From the foregoing, it will be seen that the present invention provides a very simple compact bi-directional actuator which is rapid in its response and completely free from gear backlash and also operates in either direction. It will also be seen that the two hysteresis clutches can readily be adjusted to have the desired tractive effect and in particular to be in balance with each other.

I claim:

1. A bi-directional actuator of the character described, comprising a rotatable shaft, a pair of hysteresis rotors made of permanent magnet material journalled on said shaft and severally having thin walled cylindrical terminal portions extending toward each other, a first annular magnetically permeable member arranged between said rotors and fixed to said shaft and having two concentric annular series of spaced poles severally projecting radially toward and in closely spaced relation to said cylindrical terminal portions of said hysteresis rotors, a second annular magnetically permeable member embracing the exterior of both of said cylindrical terminal portions of said hysteresis rotors and rotatable concentric with reference to said shaft and having two annular series of spaced poles severally projecting radially toward said cylindrical terminal portions of said hysteresis rotors and in closely spaced relation to said first two series of poles, a pair of inductance coils carried by said first magnetically permeable member and severally arranged to establish a magnetic field across the poles of each companion series of poles and through the corresponding hysteresis rotor, and means arranged to couple said second magnetically permeable member to rotate with said shaft including means adjustably fixing each series of spaced poles of said second magnetically permeable member at different rotative positions with reference to the corresponding opposing series of spaced poles of said first magnetically permeable member.

2. A bi-directional actuator of the character described, comprising a rotatable shaft, a pair of hysteresis rotors made of a permanent magnet material journalled on said shaft and severally having thin walled cylindrical terminal portions extending toward each other, a first annular magnetically permeable inner body member arranged between said rotors and fixed to said shaft and having a pair of axially spaced channels providing a radially projecting central rim between said channels and said channels providing radially projecting outer rims at the opposite axial ends of said inner body member, two concentric annular series of spaced poles severally projecting radially outwardly from said outer rims toward and in closely spaced relation to said cylindrical terminal portions of said hysteresis rotors, a pair of ring members of magnetically permeable material arranged concentric with reference to said shaft and secured to said central rim and projecting axially into embracing relation with said cylindrical terminal portions of said rotors, an annular series of spaced holes on each ring member projecting radially inwardly toward the cylindrical terminal portion of the corresponding hysteresis rotor and in closely spaced relation to the annular series of poles projecting from the corresponding outer rim, and an inductance coil arranged in each of said axially spaced channels to severally establish magnetic fields across the poles of said corresponding series of poles and through the corresponding hysteresis rotors, with said central rim forming a flux path common to all of said magnetically permeable members.

References Cited in the file of this patent

UNITED STATES PATENTS

| 2,591,395 | Bennett | Apr. 1, 1952 |
| 2,806,158 | Emery | Sept. 10, 1957 |

FOREIGN PATENTS

| 720,476 | Germany | May 7, 1942 |
| 740,603 | Germany | Oct. 25, 1943 |